United States Patent
Herman et al.

(10) Patent No.: US 10,628,690 B2
(45) Date of Patent: Apr. 21, 2020

(54) SYSTEMS AND METHODS FOR AUTOMATED DETECTION OF TRAILER PROPERTIES

(71) Applicant: Ford Global Technologies, LLC, Dearborn, MI (US)

(72) Inventors: David Michael Herman, Southfield, MI (US); David A. Herman, Southfield, MI (US); Stephen Jay Orris, Jr., New Boston, MI (US); Nunzio DeCia, Northville, MI (US); David Joseph Orris, Southgate, MI (US); Nicholas Alexander Scheufler, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 15/975,438

(22) Filed: May 9, 2018

(65) Prior Publication Data
US 2019/0347498 A1    Nov. 14, 2019

(51) Int. Cl.
*G06K 9/00* (2006.01)
*G06T 7/11* (2017.01)
(Continued)

(52) U.S. Cl.
CPC ............ *G06K 9/00825* (2013.01); *G06T 7/11* (2017.01); *G06T 7/215* (2017.01); *G08G 1/162* (2013.01);
(Continued)

(58) Field of Classification Search
CPC ........... G06K 9/00825; G06K 2209/15; G06K 9/00805; G06K 9/00; G06K 9/00791;
(Continued)

(56) References Cited

U.S. PATENT DOCUMENTS

| | | |
|---|---|---|
| 5,617,490 A | 4/1997 | Kume |
| 5,717,390 A | 2/1998 | Hasselbring |

(Continued)

FOREIGN PATENT DOCUMENTS

| | | |
|---|---|---|
| CN | 106683139 A | 5/2017 |
| CN | 107226087 A | 10/2017 |

(Continued)

OTHER PUBLICATIONS

Besl, Paul J., et al., *A Method for Registration of 3-D Shapes*, IEEE Trans. on Pattern Analysis and Machine Intelligence, 1992, 14 (2): 239-256, IEEE Computer Society: Los Alamitos, CA, USA, 18 pages.

(Continued)

*Primary Examiner* — Mahendra R Patel
(74) *Attorney, Agent, or Firm* — Frank Lollo; Eversheds Sutherland (US) LLP (57) ABSTRACT

Methods and apparatus are disclosed for automated detection of trailer properties. An example vehicle includes an inter-vehicle communication module and an infotainment head unit. The infotainment head unit is configured to detect presence of an attached trailer. The infotainment head unit is also configured to, in response to a determination that the attached trailer is an unrecognized trailer broadcast a request for images via the inter-vehicle communication module, perform semantic segmentation on the images, generate a three dimensional point cloud using the segmented images, and estimate a property of the attached trailer based on the three dimensional point cloud.

20 Claims, 7 Drawing Sheets

(51) Int. Cl.
*G08G 1/16* (2006.01)
*G06T 7/215* (2017.01)
*H04W 4/40* (2018.01)

(52) U.S. Cl.
CPC ............... *G06K 2209/15* (2013.01); *G06T 2207/10028* (2013.01); *G06T 2207/20164* (2013.01); *H04W 4/40* (2018.02)

(58) Field of Classification Search
CPC . G06T 7/215; G06T 7/11; G06T 17/00; G06T 7/50; G06T 2207/10028; G06T 2207/20164; G06G 1/162; B60W 30/09; G05D 1/0274; G05D 1/0246; B60R 1/00; G01S 13/93; G01S 15/93; G01S 17/93; G08G 1/16; H04W 4/40
USPC ............ 382/104, 159, 105; 701/70, 36, 409
See application file for complete search history.

(56) References Cited

U.S. PATENT DOCUMENTS

| | | |
|---|---|---|
| 6,587,597 B1 | 7/2003 | Nakao |
| 7,586,489 B2 | 9/2009 | Muller-Fischer |
| 8,228,380 B2 | 7/2012 | Hardee et al. |
| 8,473,196 B2 | 6/2013 | Basnayake |
| 8,817,101 B2 | 8/2014 | Hanisch |
| 9,135,754 B2 | 9/2015 | Ng-Thow-Hing |
| 9,165,219 B2 | 10/2015 | Chen |
| 9,311,818 B2 | 4/2016 | Lin et al. |
| 9,324,201 B2 | 4/2016 | Jun |
| 9,424,725 B1 | 8/2016 | Keohane |
| 9,440,627 B2 | 9/2016 | Kurtovic et al. |
| 9,477,894 B1 | 10/2016 | Reed et al. |
| 9,547,912 B2 | 1/2017 | Kotz et al. |
| 9,558,667 B2 | 1/2017 | Bowers |
| 9,619,925 B2 * | 4/2017 | Leber .................... A61B 6/037 |
| 9,672,440 B2 | 6/2017 | Saward |
| 9,762,880 B2 | 9/2017 | Pflug |
| 9,784,887 B1 | 10/2017 | Ulmer |
| 9,813,619 B2 | 11/2017 | An |
| 9,928,544 B1 | 3/2018 | Hasan |
| 2002/0130953 A1 | 9/2002 | Riconda |
| 2003/0212567 A1 | 11/2003 | Shintani et al. |
| 2009/0231469 A1 | 9/2009 | Kato |
| 2011/0218896 A1 | 9/2011 | Tonnon |
| 2013/0103305 A1 | 4/2013 | Becker et al. |
| 2013/0342333 A1 | 12/2013 | Hutchings |
| 2014/0324247 A1 | 10/2014 | Jun |
| 2015/0054716 A1 | 2/2015 | Hirabayashi |
| 2015/0054934 A1 | 2/2015 | Haley |
| 2015/0134675 A1 | 5/2015 | Ellis |
| 2015/0268058 A1 * | 9/2015 | Samarasekera .... G06K 9/00637 701/409 |
| 2015/0344010 A1 * | 12/2015 | Kurtovic ............... B60T 8/1708 701/70 |
| 2016/0059780 A1 * | 3/2016 | Lavoie .................... B60R 1/00 348/118 |
| 2016/0101811 A1 * | 4/2016 | Kyrtsos .................. B62D 13/06 701/25 |
| 2016/0153778 A1 * | 6/2016 | Singh ...................... G06T 7/60 701/36 |
| 2016/0297360 A1 * | 10/2016 | Smyth ..................... B60Q 9/00 |
| 2016/0325741 A1 | 11/2016 | Furst |
| 2016/0371968 A1 | 12/2016 | Almansour |
| 2017/0011378 A1 | 1/2017 | Inoue |
| 2017/0057413 A1 * | 3/2017 | Shehan .................. G08G 1/167 |
| 2017/0195564 A1 | 7/2017 | Appia |
| 2017/0261336 A1 | 9/2017 | Schmidt |
| 2017/0300761 A1 * | 10/2017 | Chaney, Jr. ............... B60R 1/00 |
| 2017/0341583 A1 * | 11/2017 | Zhang ...................... G06T 7/73 |
| 2017/0368897 A1 * | 12/2017 | Brickley ................. H04W 4/70 |
| 2017/0374502 A1 | 12/2017 | Gabel |
| 2018/0001814 A1 | 1/2018 | Salter |
| 2018/0001928 A1 * | 1/2018 | Lavoie ................... B62D 13/06 |
| 2018/0027224 A1 | 1/2018 | Javidnia |
| 2018/0032829 A1 | 2/2018 | Kim |
| 2018/0219643 A1 | 8/2018 | Naka |
| 2018/0290594 A1 | 10/2018 | Abdel-Rahman |
| 2018/0321905 A1 | 11/2018 | Fountaine |
| 2018/0336421 A1 * | 11/2018 | Huang ............... G06K 9/00791 |

FOREIGN PATENT DOCUMENTS

| | | | |
|---|---|---|---|
| DE | 102009031319 | | 1/2011 |
| DE | 102016212181 | | 1/2018 |
| EP | 1462762 | | 9/2004 |
| JP | 2005005978 A | | 1/2005 |
| JP | 2005209079 | | 8/2005 |
| JP | 2005209079 A | * | 8/2005 |
| JP | 2017068640 | | 4/2017 |
| KR | 101760312 | | 7/2017 |

OTHER PUBLICATIONS

Brailean, James C., et al., *Noise Reduction Filters for Dynamic Image Sequences: A Review*, Proceedings of the IEEE, 1995, 83.9: 1272-1292, 21 pages.

Buades, Antoni, et al., *Multi Image Noise Estimation and Denoising*, 2010, 29 pages.

Carceroni, Rodrigo, et al., *Structure From Motion With Known Camera Positions*, Computer Vision and Pattern Recognition, 2006, IEEE Computer Society Conference on vol. 1, 10 pages.

Chen, H., et al., *3D Free-Form Object Recognition in Range Images Using Local Surface Patches*, 2007, Pattern Recognition Letters, vol. 28, No. 10. 4 pages.

Chwa, Dongkyoung, et al., *Camera Motion Estimation for 3-D Structure Reconstruction of Moving Objects*, 2012 IEEE International Conference on Systems, Man, and Cybernetics (SMC), 6 pages.

Crandall, David J., et al. *SfM with MRFs: Discrete-Continuous Optimization for Large-Scale Structure from Motion*, IEEE Transactions on Pattern Analysis & Machine Intelligence, 2013, vol. 35, No. 12, 14 pages.

Dekeyser, Fabien, et al. *Restoration of Noisy, Blurred, Undersampled Image Sequences Using a Parametric Motion Model*, 2000, Proc. of the ISIVC, 14 pages.

Dubois, Eric et al., *Noise Reduction in Image Sequences Using Motion-Compensated Temporal Filtering*, 1984, IEEE transactions on communications 32.7, 7 pages.

Nilosek, David et al., *Assessing Geoaccuracy of Structure from Motion Point Clouds From Long-Range Image Collections*, Optical Engineering, 2014, 53.11, 11 pages.

Papazov, Chavdar, et al., *An Efficient Ransac for 3d Object Recognition in Noisy and Occluded Scenes*, Asian Conference on Computer Vision, 2010, Springer, Berlin, Heidelberg, 14 pages.

Rosman, Guy, et al., *Patch-Collaborative Spectral Point-Cloud Denoising*, Computer Graphics Forum, 2013, vol. 32, No. 8, 12 pages.

Tombari, F., et al. *Object Recognition in 3D Scenes with Occlusions and Clutter by Hough Voting*, 2010, 4th Pacific-Rim Symposium on Image and Video Technology, 7 pages.

Long, Jonathan et al., *Fully Convolutional Networks for Semantic Segmentation*, Mar. 2015, 10 pages.

Badrinarayanan, Vijay et al., *SegNet: A Deep Convolutional Encoder-Decoder Architecture for Image Segmentation*, Oct. 2016, 14 pages.

Yu, Fisher et al., *Multi-Scale Context Aggregation by Dilated Convolutions*, Apr. 2016, 13 pages.

Chen, Liang-Chieh et al., *DeepLab: Semantic Image Segmentation with Deep Convolutional Nets, Atrous Convolution, and Fully Connected CRFs*, May 2017, 14 pages.

Lin, Guosheng et al., *RefineNet: Multi-Path Refinement Networks for High-Resolution Semantic Segmentation*, Nov. 2016, 11 pages.

Zhao, Hengshuang et al., *Pyramid Scene Parsing Network*, Apr. 2017, 11 pages.

Peng, Chao et al., *Large Kernel—Improve Semantic Segmentation by Global Convolutional Network*, Mar. 2017, 11 pages.

(56) References Cited

OTHER PUBLICATIONS

Mitra, Niloy J. et al., "*Estimating Surface Normals in Noisy Point Cloud Data*," International Journal of Computational Geometry & Applications, pp. 261-276, vol. 14, 2004, 16 pages.

Han, Xian-Feng et al., "*A Review of Algorithms for Filtering the 3D Point Cloud*," Signal Processing: Image Communication, pp. 103-112 2017, 10 pages.

Brostow, Gabriel J., Segmentation and Recognition using Structure from Motion Point Clouds, 2008, 14 pages.

Eigen, David et al., Depth Map Prediction From a Single Image Using a Multi-Scale Deep Network, 2014, 9 pages.

Finlayson, Graham, Detecting Illumination in Images, 2007, 8 pages.

Girdhar, Rohit et al., Learning a Predictable and Generative Vector Representation for Objects, Springer International Publishing, 2016, 26 pages.

Hui, Tak-Wai et al., Depth Map Super-Resolution by Deep Multi-Scale Guidance, Springer International Publishing, 2016, 17 pages.

Izadi, Shahram, KinectFusion: Real-Time 3D Reconstruction and Interaction Using a Moving Depth Camera, 2011, 10 pages.

Laskowski, Maciej, Detection of Light Sources in Digital Photographs, 2007, 6 pages.

Lin, Shu-Chin et al., Filling Holes in 3D Scanned Model Base on 2D Image Inpainting, 2017, 6 pages.

Marton, Zoltan Csaba, On Fast Surface Reconstruction Methods for Large and Noisy Point Clouds, 2009, 6 pages.

Nguyen, Anh, 3D Point Cloud Segmentation: A Survey, 2013, 6 pages.

Pauly, Mark, Efficient Simplification of Point-Sampled Surfaces, 2002, 8 pages.

Remondino, Fabio, From Point Cloud to Surface: The Modeling and Visualization Problem, 2003, 11 pages.

Xiang, Yu et al., ObjectNet3D: A Large Scale Database for 3D Object Recognition, 2016, 16 pages.

Zach, Christopher, Fast and High Quality Fusion of Depth Maps, 2008, 8 pages.

Zhang, Yiwei et al., A Fast 3D Reconstruction System With a Low-Cost Camera Accessory, 2015, 7 pages.

Zhu, Zhuotun et al., Deep Learning Representation using Autoencoder for 3D Shape Retrieval, 2016, 6 pages.

\* cited by examiner

SYSTEMS AND METHODS FOR AUTOMATED DETECTION OF TRAILER PROPERTIES

TECHNICAL FIELD

The present disclosure generally relates to vehicle-to-vehicle communication and, more specifically, to systems and methods for automated detection of trailer properties.

BACKGROUND

Today, vehicles (e.g., trucks) with trailers attached to the vehicle enable users the ability to back-up the trailer. In some such instances, the vehicle converts the user's desired path into a corrected path based on knowledge of the trailer (e.g., trailer geometry, trailer weight, etc.) combined with a manual visual inspection of the trailer position (e.g., relative to the vehicle). While this backup assist feature is impressive, one or more properties of the trailer may need to be input by the user before the backup assist feature is enabled.

Increasing, though, vehicles and stationary infrastructure objects include cameras or other sensors (such as LiDAR, etc.) and are capable of communicating with vehicles through inter-vehicle communication. This inter-vehicle communication network is sometimes referred to as vehicle-to-vehicle (V2V) and vehicle-to-infrastructure (V2I) communication (sometimes referred to collectively as V2X communication).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for automated detection of trailer properties. An example vehicle disclosed herein includes an inter-vehicle communication module and an infotainment head unit. The infotainment head unit is configured to detect presence of an attached trailer. The infotainment head unit is also configured to, in response to a determination that the attached trailer is an unrecognized trailer broadcast a request for images via the inter-vehicle communication module, perform semantic segmentation on the images, generate a three dimensional point cloud using the segmented images, and estimate a property of the attached trailer based on the three dimensional point cloud.

An example disclosed method for automated detection of trailer properties includes detecting, via a processor of a vehicle, presence of an attached trailer. The example method also includes, in response to a determination that the attached trailer is an unrecognized trailer, broadcasting, via an inter-vehicle communication module, a request for images, performing, via the processor, semantic segmentation on the images, generating, via the processor, a three dimensional point cloud using the segmented images, and estimating, via the processor, a property of the attached trailer based on the three dimensional point cloud.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, to facilitate a backup assist feature of a vehicle attached to a trailer, a vehicle uses information (e.g., trailer properties) associated with the trailer attached to the vehicle. However, techniques to determine the trailer properties often rely on the driver (or user) supplying relevant information. For example, the driver may prompted to provide geometries of the vehicle and attached trailer including, for example: (a) the horizontal distance from the license plate to the center of the ball hitch of the trailer, (b) the horizontal distance from the center of the ball hitch to the center of a sticker, (c) the distance from the rear-view camera to the center of the sticker, and (d) the distance from the tailgate to the center of the trailer axle (single axle) or the center of the trailer axles (two or more axles). The driver may have wrong information, may have incorrectly measured the relevant dimension, or may forget that an action has changed a property associated with the vehicle and/or attached trailer. For example, the driver may forget to enter information into the vehicle after adding/removing content from the trailer, thereby changing the center of gravity of the vehicle and attached trailer.

Increasingly, vehicles and infrastructure objects (e.g., traffic signals, bridges, police surveillance pods, lamp posts, etc.) include inter-vehicle communication modules that facilitate communication between vehicles, infrastructure, and pedestrians. These vehicles and infrastructure objects also increasing include and/or have $3^{rd}$ party support for cameras (e.g., color cameras, monochrome cameras, time-of-flight cameras, stereo cameras, monocular cameras, etc.)

and other sensors (e.g., LiDAR, etc.) available to capture images or other type of data (e.g. point cloud data) of nearby objects and vehicles.

As discussed below, from time-to-time (e.g., periodically, in response to an event, etc.), a vehicle (sometimes referred to herein as a "host vehicle") broadcasts a request for images and sensor data (e.g., radar data, LiDAR data, ultrasonic sensor data, etc.) from other vehicles (sometimes referred to herein as "target vehicles") and/or inter-vehicle communication enabled infrastructure modules (sometimes referred to herein as "roadside units") in the vicinity using an inter-vehicle communication module (sometimes referred to herein as a "vehicle-to-vehicle (V2V) module" or a "dedicated short range communication (DSRC) module"). The requests include information that facilitate the target vehicles locating and/or identifying the host vehicle so that the target vehicle can capture one or more images or other data sources (e.g. point cloud data obtained from LiDAR) of the host vehicle. For example, the request may include the position, direction of travel, velocity, color, and/or model of the host vehicle, etc. As used herein, the term "host vehicle" includes a vehicle (such as a truck, etc.) and a trailer attached to the vehicle. As another example, the request may include an image or a set of feature points of one or more portions of the vehicle to facilitate the target vehicles. In some examples, the host vehicle may also request and capture data and images of the host vehicle itself via, for example, sensors associated with the host vehicle (e.g., one or more rear-view cameras, etc.), which may be used for estimating a camera position of the target vehicles and/or the roadside units based on image or data feature points that are present in the different sets of data and images. Such a process may be used to filter out erroneous images and/or data sources due to, for example, bad V2X positioning (e.g., the target vehicle does not have a line-of-sight with the host vehicle, etc.). As described below, the received images and/or data may be used to determine the position of the trailer relative to the host vehicle. In some examples, the received images and/or data may be used to align the received images and/or data and/or generated images (such as structure from motion maps, point clouds, etc.) in which a trailer angle may vary over time (e.g., by combining measurements from when the host vehicle is turning and then is traveling in a straightward direction, etc.)

The host vehicle receives the images and the sensor data from the target vehicles. As the images are received, the host vehicle performs semantic segmentation to identify different objects (e.g., the host vehicle including the attached trailer) and/or parts of objects (e.g., wheels of the attached trailer, objects mounted to the host vehicle and/or the attached trailer, etc.) in the images and progressively generates a composite image of the vehicle using a process of three-dimensional scene stitching, such as a structure from motion technique and/or sensor fusion. Using the segmentation information, the composite image, and a three dimensional model of the host vehicle and/or the attached trailer stored in memory, the vehicle constructs a three dimensional point cloud of the vehicle and the attached trailer. Sensor fusion combines sensor data (e.g., three-dimensional sensor data, such as from radar, LiDAR, ultra-sonic sensors, etc.) received from the target vehicles and/or the host vehicle to further define the three dimensional structure of the host vehicle including the attached trailer. Using the three dimensional structure of the host vehicle including the attached trailer, the vehicle estimates properties and geometries of the attached trailer.

In some examples, the vehicle facilitates driver feedback via a human-machine interface (HMI), such as the infotainment system of the vehicle and/or an application (such as FordPass) executing on a mobile device (e.g., a smartphone, a smart watch, etc.). Through the HMI, the driver may indicate that the attached trailer is a new trailer (e.g., that the vehicle should initiate automated detection of trailer properties), that the trailer is a previously used trailer (e.g., that the vehicle should retrieve properties of the trailer from memory), that the driver can confirm whether the three dimensional representation of the vehicle and/or the attached vehicle satisfies an acceptability threshold (e.g., either imposed by the driver and/or based on statistical techniques by the vehicle), that the driver can drive on a particular to road to receive additional images and sensor data from target vehicles, etc.

Once the properties of the trailer are estimated, the vehicle saves the estimated trailer properties for use during subsequent drives. Additionally, the estimated trailer properties may be used to facilitate trailer backup assist feature. Example properties that may be estimated by the disclosed techniques include the geometry of the trailer (e.g., license plate to ball hitch distance, ball hitch to sticker distance, camera to sticker distance, tailgate to trail axle distance), type of trailer, trailer weight estimate for braking (e.g., weight distribution, etc.), drive straight behavior to confirm and/or verify position of pattern during straight drive (e.g., rear-view camera versus trailer angle measured by the disclosed techniques), etc. As used herein, a "sticker" may be an optical pattern that is affixed to (and/or associated with) the attached trailer to facilitate estimating properties of the attached trailer. In some examples, disclosed techniques may be able to recognize the visual appearance of a given trailer and store the relevant properties of the trailer without an optical pattern. Additional properties that may be estimated based on the disclosed techniques include identifying the position or appearance of the sticker affixed to the trailer and estimating weight distribution on the trailer to improve driving and braking dynamics.

Thus, in some embodiments, after determining the presence of a connected trailer, the host vehicle makes several requests, via an inter-vehicle communication module for images of the host vehicle and attached trailer from nearby vehicles and/or infrastructure during a range of drive maneuvers, such as turning, reversing, and driving forward. The vehicle provides feedback to the driver (e.g., via the HMI) that the vehicle has identified a new trailer and is in the process of estimating properties associated with the trailer. Furthermore, the vehicle may prompt the drive along a recommended route that may facilitate completing the estimated measurements based on one or more cameras from other vehicles or roadside units that are available along the recommended route. The vehicle uses the captured images of the trailer, combined with structure from motion techniques that identifies and utilizes features of the vehicle and the attached trailer. In some examples, the structure from motion techniques matches many points of distinct features on a series of images and then determines the three dimensional positions of these points. The vehicle then combines the structure from motion techniques with a three dimensional model of the vehicle (e.g., a factory image and/or 3D model data of the vehicle stored in memory) and the attached vehicle to measure (or estimate) geometric properties of the trailer based on the produced geometries. For example, the vehicle may use a factory stored image of the vehicle to calibrate the three dimensional model generated by the vehicle, which may include noise, may have relatively poor precision, may have relatively poor accuracy, and/or may include other skew/failure modes of the data resulting in an error of the three dimensional model generated by the vehicle. The three dimensional model may also be used to estimate the geometry of the attached trailer and its angle compared to the vehicle. The vehicle may then use these estimated properties to generate a control model for auto backup assist without requiring the driver to manually provide one or more measurements.

Furthermore, in some examples, because the trailer contents are being monitored for driving dynamics (e.g., by periodically requesting images of the host vehicle and the attached trailer), the disclosed techniques may be used to detect shifting trailer contents or missing contents (e.g., via theft of content, content falling off of the trailer, etc.). For example, the host vehicle may request images and/or data of the host vehicle when a change in engine torque is detected, at periodic time intervals (e.g., every five minutes, etc.).

Thus, disclosed techniques facilitate real-time monitoring of the configuration of the attached trailer and knowledge of its configuration to allow for improved control of driving dynamics, breaking control, and other benefits that may be appreciated by a driver when driving with a trailer attached to their vehicle.

Figure 1:
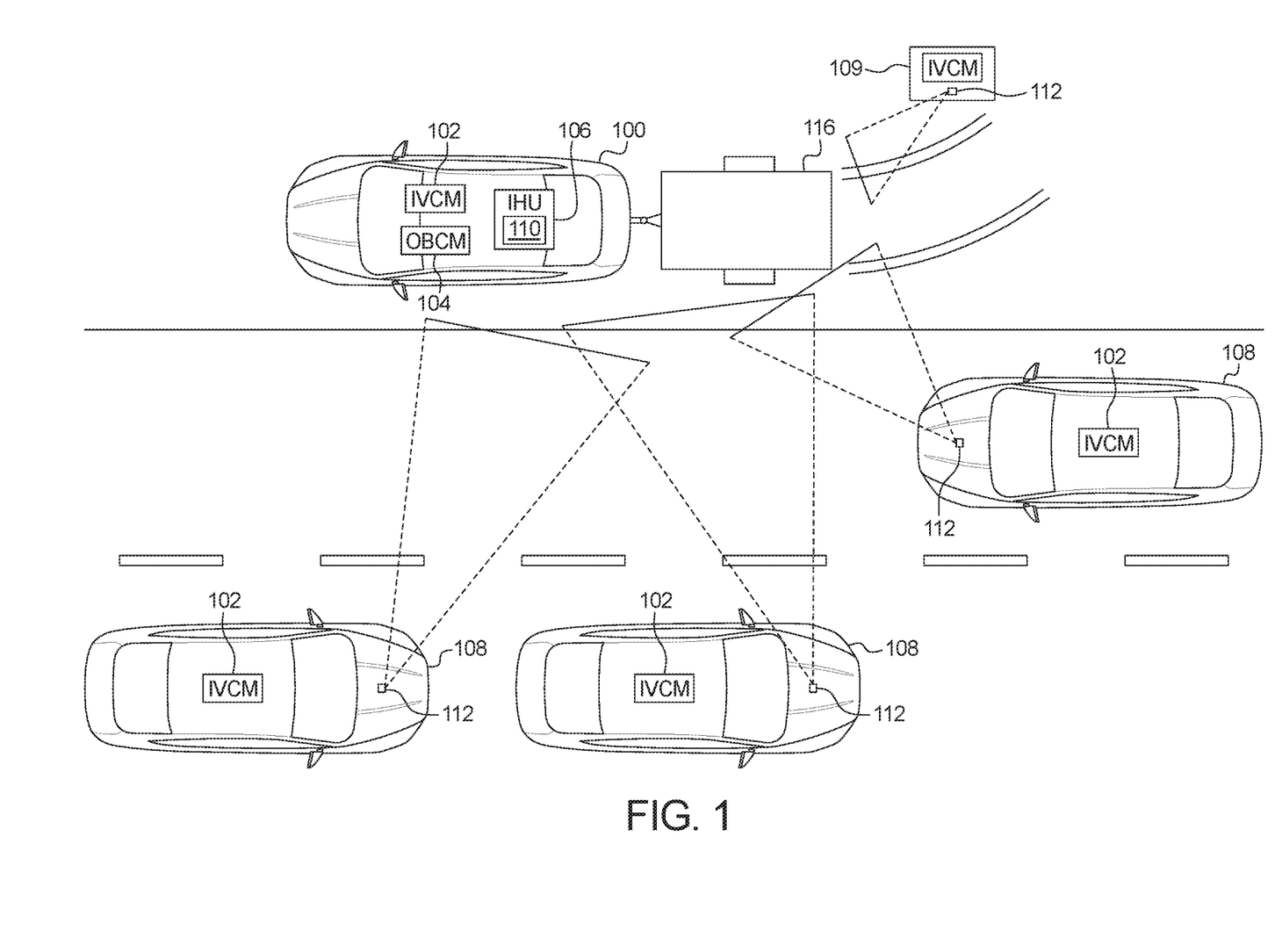
FIG. 1 illustrates an example vehicle operating in accordance with the teachings of this disclosure.

FIG. 1 illustrates a host vehicle 100 operating in accordance with the teachings of this disclosure. The host vehicle 100 may be a standard gasoline powered vehicle, a hybrid vehicle, an electric vehicle, a fuel cell vehicle, and/or any other mobility implemented type of vehicle. The host vehicle 100 may be any type of motor vehicle, such as a car, a truck, a semi-trailer truck, or a motorcycle, etc. Additionally, in the illustrated example, the host vehicle 100 is towing a trailer 116 (which, as discussed below, may be treated as part of the host vehicle 100), which may, for example, include other objects, such as boat(s), horse(s), lawn equipment, etc. The host vehicle 100 includes parts related to mobility, such as a powertrain with an engine, a transmission, a suspension, a driveshaft, and/or wheels, etc. The host vehicle 100 may be non-autonomous, semi-autonomous (e.g., some routine motive functions controlled by the host vehicle 100), or autonomous (e.g., motive functions are controlled by the host vehicle 100 without direct driver input). The host vehicle and/or the target vehicle(s) may be stationary or in motion during image capture. In the illustrated example of FIG. 1, the host vehicle 100 includes an inter-vehicle communication module (IVCM) 102, an on-board communication module (OBCM) 104, and an infotainment head unit (IHU) 106.

The inter-vehicle communication module 102 includes antenna(s), radio(s) and software to broadcast messages and to establish communication between the host vehicle 100 and target vehicles 108, roadside units 109, and mobile device-based modules (not shown). More information on the inter-vehicle communication network and how the network may communicate with vehicle hardware and software is available in the U.S. Department of Transportation's Core June 2011 System Requirements Specification (http://www.its.dot.gov/meetings/pdf/CoreSystem_SE_SyRS_RevA%20(2011-06-13).pdf), which is herein incorporated by reference in its entirety along with all of the documents referenced on pages 11 to 14 of the SyRS report. The inter-vehicle communication systems may be installed on vehicles and along roadsides on infrastructure. The inter-vehicle communication systems incorporated into infrastructure (e.g., traffic signals, street lights, municipal cameras, etc.) is known as a "roadside" system or unit. Inter-vehicle communication may be combined with other technologies, such as Global Position System (GPS), Visual Light Communication (VLC), Cellular Communications, short range radar, advanced driver assistant system (ADAS), and autonomous vehicle system (perception and localization), facilitating the vehicles communicating their position, speed, heading, relative position and/or inclination to other objects and to exchange information with other vehicles or external computer systems. Inter-vehicle communication systems can be integrated with other systems such as mobile phones.

In some examples, the inter-vehicle communication module 102 implements the Dedicated Short Range Communication (DSRC) protocol. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system, it is also meant to cover dedicated wireless communication systems between cars and roadside infrastructure systems, which are integrated with GPS and are based on an IEEE 802.11 protocol for wireless local area networks (such as, 802.11p, cellular V2X, etc.).

The on-board communications module 104 includes wired or wireless network interfaces to enable communication with external networks. The on-board communications module 104 includes hardware (e.g., processors, memory, storage, antenna, etc.) and software to control the wires and/or wireless network interfaces. In the illustrated example, the on-board communications module 104 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others), and Wireless Gigabit (IEEE 802.11ad), etc.). In some examples, the on-board communications module 104 includes a wired and/or wireless interface (e.g., an auxiliary port, a Universal Serial Bus (USB) port, a Bluetooth® wireless node, etc.) to communicatively couple with a mobile device (e.g., a smartphone, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. In some examples, the vehicle 100 communicates with an external server, via the on-board communications module 104 to receive information (e.g., weather, background images, etc.) about a current location of the vehicle 100. For example, the vehicle 100 may request from the external server background images of the vicinity of the vehicle 100 to enhance the composite image generated by the vehicle 100. In some examples, the vehicle 100 receives from the external server a three dimensional model of the vehicle 100 that is used, at least in part, to provide additional viewing perspectives in the composite image that may not been captured in received images.

The infotainment head unit 106 provides an interface between the vehicle 100 and a user. The infotainment head unit 106 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices, etc.) actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 106 includes hardware (e.g., a processor or controller, memory, storage, etc.) and software (e.g., an operating system, etc.) for an infotainment system (such as SYNC® and MyFord® by Ford®, Entune® by Toyota®, IntelliLink® by GMC®, etc.). Additionally, the infotainment head unit 106 displays the infotainment system on, for example, the center console display. In the illustrated example of FIG. 1, the infotainment head unit 106 includes a properties estimator 110. Alternatively, in some examples, the properties estimator 110 may be incorporated into another vehicle module, such as a body control module or an autonomy unit that control autonomous functions of the vehicle 100.

The properties estimator 110 detects the presence of a trailer, estimates properties associated with the trailer, and then stores the estimated properties for subsequent use, such as when the trailer backup assist system of the vehicle 100 is enabled. To detect the presence of the trailer 116, the properties estimator 110 may utilize one or more sensors of the vehicle 100 (e.g., a rear-view camera of the vehicle 100) that performs feature recognition and identifies the trailer 116 and/or an optical pattern attached to the trailer. The optical pattern (or sticker) may include characteristics (e.g., unique pattern(s) that identify a specific trailer) that identifies the optical pattern to the rear-view camera as an optical pattern to the trailer. While an optical pattern is not required to detect the presence of the trailer 116, the inclusion of the optical pattern on the trailer 116 may facilitate a relatively more robust solution for estimating properties of the trailer 116 in view of, for example, different lighting conditions and/or trailer configurations. In some examples, the properties estimator 110 detects the presence of the trailer 116 based on an indication that driving dynamics associated with the vehicle 100 have changed (e.g., indicating that the trailer 116 has been attached to the vehicle 100). In some examples, the properties estimator 110 detects the presence of the trailer 116 in response to an indication that trailer break lights were connected to the vehicle.

After the properties estimator 110 detects the presence of the trailer 116, the properties estimator 110 determines whether the detected trailer is a previously attached trailer. For example, the properties estimator 110 may compare characteristics of the attached trailer 116 to characteristics of past trailers stored in memory. For example, the properties estimator 110 may use feature points at a fixed orientation (e.g., when driving straight, from the perspective of the rear-view camera, etc.) to determine whether the trailer is a previously attached trailer. Other example characteristics that may be used by the properties estimator 110 include, for example, detected color patterns (e.g., calibrated versus solar irradiance versus weather conditions affecting color appearance), torque to get to speed, braking force to stop over a distance, braking effectiveness, etc. However, it should be appreciated that the properties estimator 110 may detect additional or alternative features and/or characteristics of the attached trailer to determine whether the attached trailer 116 is a previously attached trailer (e.g., a recognized trailer). In some examples, the properties estimator 110 may sort saved trailers based on predictions of trailers previously saved. If the properties estimator 110 determines that the attached trailer 116 is a recognized trailer (e.g., characteristics of the attached trailer 116 correspond to characteristics of a past trailer), then the properties estimator 110 retrieves the previously recorded properties of the recognized trailer and uses the retrieved properties in the control algorithm for facilitating the trailer backup assist system. In some examples, the properties estimator 110 may reimage (or re-scan) a recognized trailer. For example, the attached trailer 116 may be an "open" trailer that hauls goods such as a boat. In some such examples, the properties estimator 110 may reimage (or re-scan) the recognized trailer to determine whether the attached trailer is hauling goods (e.g., a boat, etc.).

If the properties estimator 110 was unable to recognize the attached trailer 116 as a past trailer, then the properties estimator 110 attempts to determine the geometry of the attached trailer 116, the physical positioning of the attached trailer 116 relative to the host vehicle 100, and appearance of the attached trailer 116. In some examples, the properties estimator 110 may prompt the driver before attempting to scan the attached trailer 116. For example, the properties estimator 110 may cause the infotainment head unit 106 to display a message indicating that the attached trailer 116 was unrecognized and/or request the driver initiate the scan of the attached trailer 116. In some examples, the properties estimator 110 may cause the infotainment head unit 106 to display a message identifying past recognized trailers and request that the driver determine whether the attached trailer is one of the past recognized trailers. From time-to-time, the properties estimator 110 (a) determines a geo-spatial orientation of the host vehicle 100 used to facilitate the target vehicles 108 and/or roadside units 109 determining the relative location of the host vehicle 100 compared to their location, and (b) broadcasts a request message using the inter-vehicle communication module 102. In some examples, the properties estimator 110 sends the request periodically (e.g., hourly, daily, etc.) or in response to an event (e.g., detection of an unrecognized trailer, every key cycle, entry into a densely populated area, etc.). Alternatively or additionally, in some examples, the properties estimator 110 sends the request message in response to detecting changes in the status of the host vehicle 100 and/or the attached trailer 116. For example, the properties estimator 110 may detect a change in the total gross weight and/or changes to vehicle dynamics.

The request message requests that the target vehicles 108 and/or roadside units 109 in the vicinity capture images and/or sensor data of the host vehicle 100 with their 112 (e.g., color cameras, monochrome cameras, time-of-flight cameras, stereo cameras, monocular cameras, etc.) and/or their range detection sensors (e.g., radar, LiDAR, ultrasonic sensors, etc.). The request message includes information regarding the geo-spatial orientation of the host vehicle 100. The geo-spatial orientation information includes the location (e.g., the global positioning system (GPS) coordinates, etc.), orientation (e.g., the orientation that the front of the host vehicle 100 is pointed towards, etc.), and/or other characteristics (e.g., color, make, model, etc.) that facilitates the target vehicles 108 and/or the roadside units 109 locating and identifying the host vehicle 100. For example, the geo-spatial orientation for the host vehicle 100 may include GPS coordinates, a direction of travel, and a vehicle color. In some examples, the geo-spatial orientation information also includes information about objects in the vicinity of the host vehicle 100 that can act as landmark(s) to further facilitate the target vehicles 108 and/or roadside units 109 locating the host vehicle 100. In some examples, the host vehicle 100 filters the target vehicles 108 that receive the request messages based on their location and their relative trajectory with respect to the host vehicle 100 so to reduce the quantity of request messages sent to target vehicles that are, for example, traveling the wrong direction and would not be able to provide useful information. For example, the properties estimator 110 may use the GPS coordinates of the host vehicle 100 to analyze navigation data (e.g., maps, etc.) to determine which target vehicles 108 and/or roadside units 109 are near the host vehicle 100 and that can visualize the vehicle (e.g., have line-of-sight with the host vehicle 100). For example, the properties estimator 110 may determine whether the road/highway is a divided or undivided road/highway with or without a physical barrier. For example, while a target vehicle 108 may be proximate to the host vehicle 100, the target vehicle 108 may be traveling on the other side of a physical barrier and unable to provide images and/or data of the host vehicle 100 and its surroundings. In some examples, the properties estimator 110 may determine which target vehicles 108 and/or roadside units 109 to request images and/or data from based on which target vehicles 108 and/or roadside units 109 have sight lines that are needed to complete the scan (and/or re-scan) of the attached trailer 116 and/or level of sensors. For example, a vehicle (that has front and/or side view cameras) overtaking the trailer on a desired side of the trailer may be preferred than getting an additional set of images and/or data from a parked vehicle that is next to another parked vehicle that also provided images and/or data.

The example properties estimator 110 also causes cameras and sensors of the host vehicle 100 to capture images and/or data of the host vehicle 100 and its surroundings. For example, the properties estimator 110 may cause one or more cameras and/or sensors to capture information relating to recent driving behavior, such as current wheel position, distance traveled, etc. In some examples, the properties estimator 11 causes the cameras and sensors of the host vehicle 110 to capture the images and/or data related to the host vehicle 110 at the same time (or substantially the same time) as the external images captured by the target vehicles 108 and/or the roadside units 109.

To estimate the properties of the attached trailer 116, the properties estimator 110 performs semantic segmentation on the received images, generates a composite image using the received images, and generates a three dimensional representation of the attached trailer 116 (and the host vehicle 100) using the semantic segmentation and the composite image.

Semantic segmentation is an image classification technique that assigns pixels of an image (or regions of an image, sometimes referred to as "stixels") to different constituent parts. For example, the properties estimator 110 may identify portions of an image that are associated with the host vehicle, the trailer 116, a luggage rack, bicycles, other vehicles, pedestrians, foliage, etc. To perform semantic segmentation, the properties estimator 110 uses techniques such as convolutional neural networks (e.g., fully convolutional networks (FCN), dilated confusions, encoder-decoder convolutions, deep convolutional neural networks with fully connected conditional random fields, etc.). Example techniques to perform semantic segmentation are described by (a) Zhao et al. in "Pyramid Scene Parsing Network," 2017 *IEEE Conference on Computer Vision and Pattern Recognition (CVPR)*; (b) Long et al. in "Fully Convolutional Networks for Semantic Segmentation," 2015 *IEEE Conference on Computer Vision and Pattern Recognition (CVPR)*; (c) Badrinarayanan et al. in "SegNet: A Deep Convolutional Encoder-Decoder Architecture for Image Segmentation," *IEEE Transactions on Pattern Analysis and Machine Intelligence*, vol. 39, no. 12, January 2017, pp. 2481-2495; (d) Yu et al. in "Multi-Scale Context Aggregation by Dilated Convolutions," 2015; (e) Chen et al. in "DeepLab: Semantic Image Segmentation with Deep Convolutional Nets, Artous Convolution, and Fully Connected CRFs," *IEEE Transactions on Pattern Analysis and Machine Intelligence,* 2017; (f) Lin et al. in "RefineNet: Multi-Path Refinement Networks for High-Resolution Semantic Segmentation," 2017 *IEEE Conference on Computer Vision and Pattern Recognition (CVPR)*; and (g) Peng, Chao, et al. in "Large Kernal Matters—Improve Semantic Segmentation by Global Convolution Network," 2017 *IEEE Conference on Computer Vision and Pattern Recognition (CVPR)*, which are herein incorporated by reference in their entirety.

The properties estimator 110 uses structure from motion to construct a three dimensional representation (e.g., a composite image) of the host vehicle 100 and the attached trailer 116. In some examples, the properties estimator 110 uses the results of the received images to remove objects in the images that are not related to the host vehicle, the attached trailer 116, and/or change over time. Using structure from motion techniques, the properties estimator 110 identifies feature points of the attached trailer 116 in the received images. Other example techniques for identifying feature points of the attached trailer 116 including utilizing visual SLAM. The properties estimator 110 uses the positioning of the feature points and a three dimensional model (e.g., a point cloud) of the attached trailer 116 to stitch portions of the received images together to create the composite image of the attached trailer 116. Example structure form motion techniques are described in (a) Crandall, David J., et al. in "SfM with MRFs: Discrete-Continuous Optimization for Large-Scale Structure from Motion," *IEEE Transactions on Pattern Analysis & Machine Intelligence*, vol. 35, no. 12, pp. 2841-2853, 2013; (b) Nilosek, David et al. in "Assessing geoaccuracy of structure from motion point clouds from long-range image collections," *Optical Engineering* 53.11, 2014; and (c) Rodrigo, Carceroni et al. in "Structure from motion with known camera positions," 2006 *IEEE Computer Society Conference on Computer Vision and Pattern Recognition*, vol. 1, which are herein incorporated by reference in their entirety.

The properties estimator 110 may also perform sensor fusion to improve the accuracy of the point cloud generated from the structure from motion process. For example, the properties estimator 110 may compare LiDAR data collected by the target vehicles 108 and/or the roadside units 109 to the point cloud and adjust the point cloud accordingly. While camera images provided by the target vehicles 108 and/or the roadside units 109 will generally provide relatively accurate positional information, some environment conditions (e.g., rain, etc.) may degrade the quality of the point cloud. Thus, the properties estimator 110 incorporates sensor data, such as LiDAR data, to provide an additional technique for improving the quality of the three dimensional point cloud generated using structure from motion techniques. The properties estimator 110 may also increase the accuracy of the three dimensional point cloud by further processing the three dimensional point cloud. For example, the properties estimators 110 may further utilize averaging, filtering, and scaling to a known three dimensional geometry of the vehicle. In some examples, the properties estimator 110 utilizes filters such as Gaussian filters, Median filters, or Bilateral filters to improve image quality and/or reduce the impact of noise on features included in the three dimensional point cloud. Example techniques for generating point clouds are described in: (a) Mitra, Niloy J. et al. in "Estimating surface normals in noisy point cloud data," *International Journal of Computational Geometry & Applications* 14, pp. 261-276 (2004), and (b) Han, Xian-Feng et al. in "A review of algorithms for filtering the 3D point," *Signal Processing: Image Communication* 57, pp. 103-112 (2017). Example techniques for improving image denoising for image sequences are described in: (a) Dekeyser, Fabien, et al. in "Restoration of noisy, blurred, undersampled image sequences using a parametric motion model," *Proc. of the ISIVC* 2000; (b) Dubois, Eric et al. in "Noise reduction in image sequences using motion-compensated temporal filtering," *IEEE transactions on communications*, 32.7, pp. 826-831 (1984); (c) Brailean, James C. et al. in "Noise reduction filters for dynamic image sequences: A review," *Proceedings of the IEEE* 83.9, pp. 1272-1292 (1995); and (d) Buades, Antoni et al., "Multi image noise estimation and denoising," 2010, which are herein incorporated by reference in their entirety. In some examples, the image denoising techniques on image sequences may improve the inputs in structure from motion algorithms, which may result in improved three dimensional point clouds. Additionally or alternatively, the image denoising techniques on images sequences improve the inputs in semantic segmentation algorithms, which may result in improved accuracy and/or precision in objection identification (or classification) and/or segmentation. In some examples, the image denoising techniques may be helpful under certain environmental conditions or variations in quality of camera(s) associated with the target vehicles and/or the roadside units.

The example properties estimator 110 uses the three dimensional point cloud to measure an angle between the attached trailer 116 and the host vehicle 100. As more images are received from the target vehicles 108 and/or the roadside units 109, the properties estimator 110 creates a series of measured trailer angles and associated rear view images of the trailer (some of which may include the optical pattern). The collection of this data provides a method to verify that a control model based on the measured trailer properties is capable of orienting the trailer to the desired angle during backup operations. As discussed above, the properties estimator 110 may use feature points to align the images. However, in images that include the optical pattern, the properties estimator 100 may use the optical pattern to align the images to form the three dimensional representation. The properties estimator 110 may also remove outline pixels from the three dimensional representation (sometimes referred to as a "three dimensional model") using statistical analysis techniques such as, for example, k neighbor distances, interpolation of the interaction of trailer angle and rear view image using Random sample consensus (RANSAC) or similar algorithms. Example techniques for filtering the three dimensional representation are described in: (a) Tombari et al. in "Object recognition in 3D scenes with occlusions and clutter by Hough voting," $4^{th}$ *Pacific-Rim Symposium on Image and Video Technology* (2010); (b) Chen, H. et al. in "3D free-form object recognition in range images using local surface patches," *Pattern Recognition Letters*, vol. 28, no. 10, pp. 1252-1262, 2007; (c) Besl, Paul, et al. in "A Method for Registration of 3-D Shapes," *IEEE Trans. on Pattern Analysis and Machine Intelligence*, Los Alamitos, Calif., USA: *IEEE Computer Society*, 14 (2), pp. 239-256 (1992); (d) Papazov, Chavdar et al. in "An efficient ransac for 3d object recognition in noisy and occluded scenes," *Asian Conference on Computer Vision, Springer, Berlin, Heidelberg* (2010); and (e) Rosman, Guy, et al. in "Patch-Collaborative Spectral Point-Cloud Denoising," *Computer Graphics Forum*. Vol. 32, NO. 8 (2013), which are herein incorporated by reference in their entirety.

Using the three dimensional point cloud, the example properties estimator 110 then estimates desired properties of the attached trailer 116 that may facilitate the host vehicle 100 when enabling the trailer backup assist system of the vehicle 100. The properties estimator 110 then stores the estimated properties of the attached trailer 116 and one or more characteristics associated with the attached trailer 116 in a memory of the host vehicle 100 so that the attached trailer 116 can be identified as a recognized trailer when the trailer backup assist system is subsequently enabled. In some examples, the properties estimator 110 may enable the driver to name the attached trailer 116 for subsequent retrieval of the stored properties.

In some examples, the properties estimator 100 may request target vehicles 108 and/or roadside units 109 to provide additional images of the host vehicle 100 and/or the attached trailer 116. For example, the properties estimator 110 may repeat requests for additional images until the statistical certainty of the geometry and image versus trailer angle data is within a desired error range to ensure desired control tolerances (e.g., during the trailer backup assist).

In some examples, the properties estimator 110 provides feedback to and/or requests feedback from the driver (e.g., a status update) via the infotainment head unit 106. For example, the properties estimator 110 may cause a display device of the infotainment head unit 106 to display a message indicating that a trailer was detected, that the properties estimator 110 is attempting to recognize the attached trailer as a past trailer, that the attached trailer was recognized or was not recognized, any retrieved and/or estimated properties of the attached trailer, etc. For example, the properties estimator 110 may display, via the display device of the infotainment head unit 106, that the attached trailer 116 was recognized and also display the retrieved properties. In some examples, the properties estimator 110 enables the driver to verify the retrieved properties. In some examples, the properties estimator 110 displays a progress update to the driver of the measurement estimation process. For example, the properties estimator 110 may display, via the display device, that a percentage (e.g., 90%) of the trailer has been imaged and/or measured based on, for example, point cloud noise and surface estimation, needed surface perspective, etc.

In some examples, the properties estimator 110 may be unable to properly estimate (e.g., within a statistically significant level of confidence or precision of the location of relevant features and their distances (e.g., trailer wheel to hitch distance, etc.)) one or more properties of the trailer. In some such examples, the properties estimator 110 may prompt the driver, via the display device of the infotainment head unit 104, to manually provide the properties. In some such examples, the properties estimator 110 requests additional images from target vehicles 108 and/or roadside units 109.

In some examples, using the above techniques, the properties estimator 110 is also able to estimate the geometry and contents of the attached trailer. For example, if the contents of the attached trailer are visible, the properties estimator 110 may be able inspect and understand the impact the contents have on the dynamics, geometry and/or configuration of the trailer. For example, since the properties estimator 110 is periodically collecting images of the attached trailer 110, the properties estimator 110 is able to estimate the weight of the trailer, center of mass of the attached trailer, and other information that may facilitate determining optimal driving dynamics and breaking control schemes to use without required input from the driver. The vehicle 100 may also use the properties estimated by the properties estimator 110 to avoid driving locations that may be challenging to navigate or difficult to clear due to, for example, topographic height variations based on the estimated turn radius and/or minimum clearance of the trailer. In some examples, the properties estimator 110 may estimate the fuel efficiency of the attached trailer and vehicle system based on wind resistance and mass associated with the attached trailer. In some examples, the properties estimator 110 may assist with navigation by updating navigation routes with stops for gas based on the estimated fuel efficiency.

Figure 2:
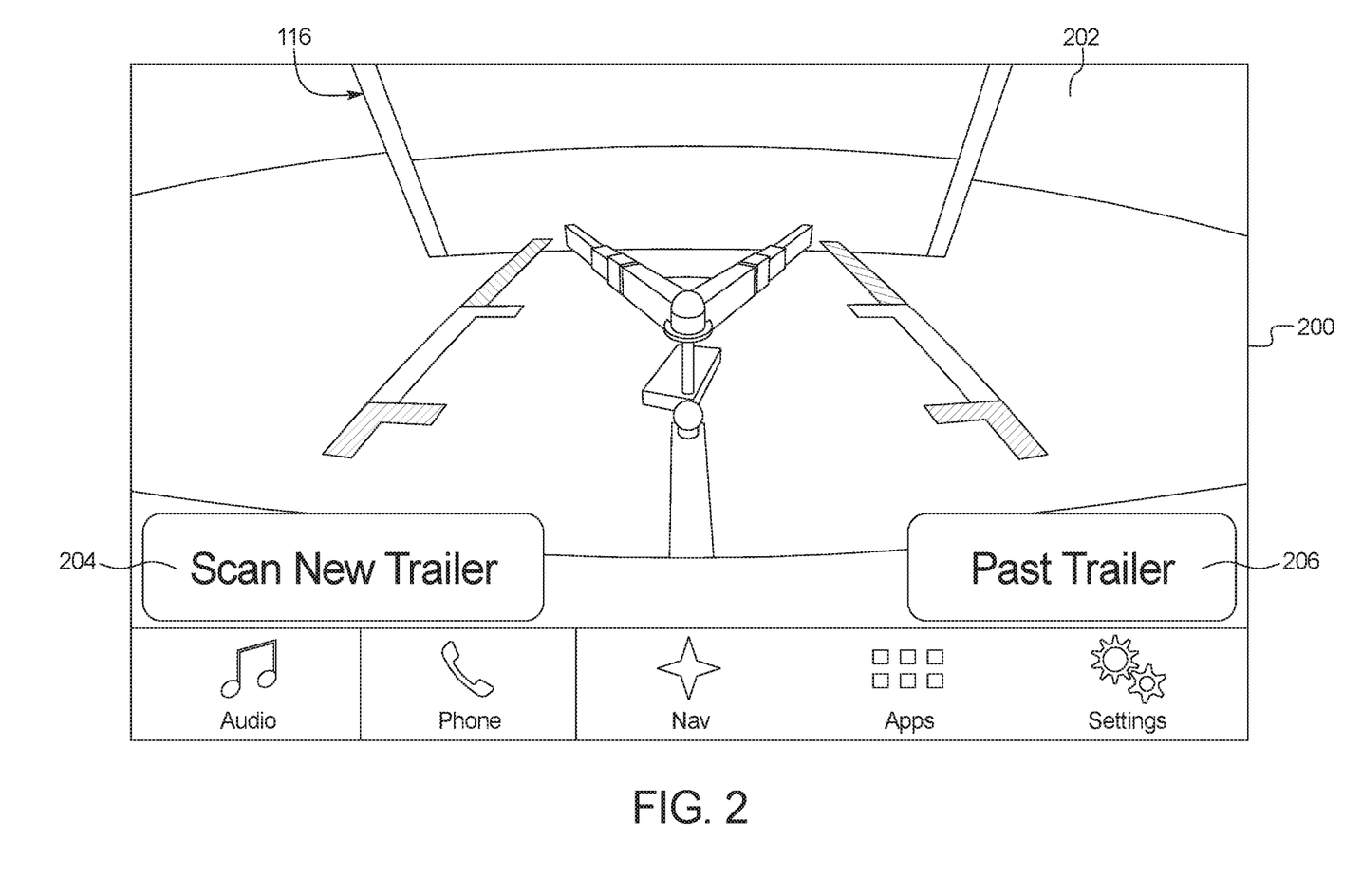
FIG. 2 illustrates an example human machine interface to initiate automated detection of trailer properties.

FIG. 2 illustrates an example human machine interface (HMI) 200 to initiate automated detection of trailer properties. In some examples, the HMI 200 is displayed on a console of the infotainment head unit 106. Additionally or alternatively, in some examples, the HMI 200 is displayed on a screen of a mobile device via an application executing on the mobile device. In the illustrated example, the user interacts with the HMI 200 via a touch screen interface. The HMI 200 depicts an image 202 captured by a camera (e.g., a rear-view camera or cameras) of the vehicle 100. In the illustrated example of FIG. 2, the image 202 indicates that the trailer 116 is attached to the vehicle 100. In response to detecting the presence of a trailer, the example HMI 200 of FIG. 2 includes a "Scan New Trailer" tool 204 and a "Past Trailer" tool 206.

The "Scan New Trailer" tool 204 facilitates the user initiating a scan of the trailer 116 attached to the vehicle 100. For example, by selecting the "Scan New Trailer" tool 204, the vehicle 100 may begin broadcasting messages requesting that other vehicles and/or inter-vehicle communication enabled infrastructure modules capture one or more images of the vehicle 100 and send the captures images to the vehicle 100.

The "Past Trailer" tool 206 facilitates the user indicating that the trailer 116 attached to the vehicle 100 is a previously scanned trailer. In some such instances, the vehicle 100 may identify the attached trailer 116 and retrieve stored properties of the identified trailer 116.

Figure 3:
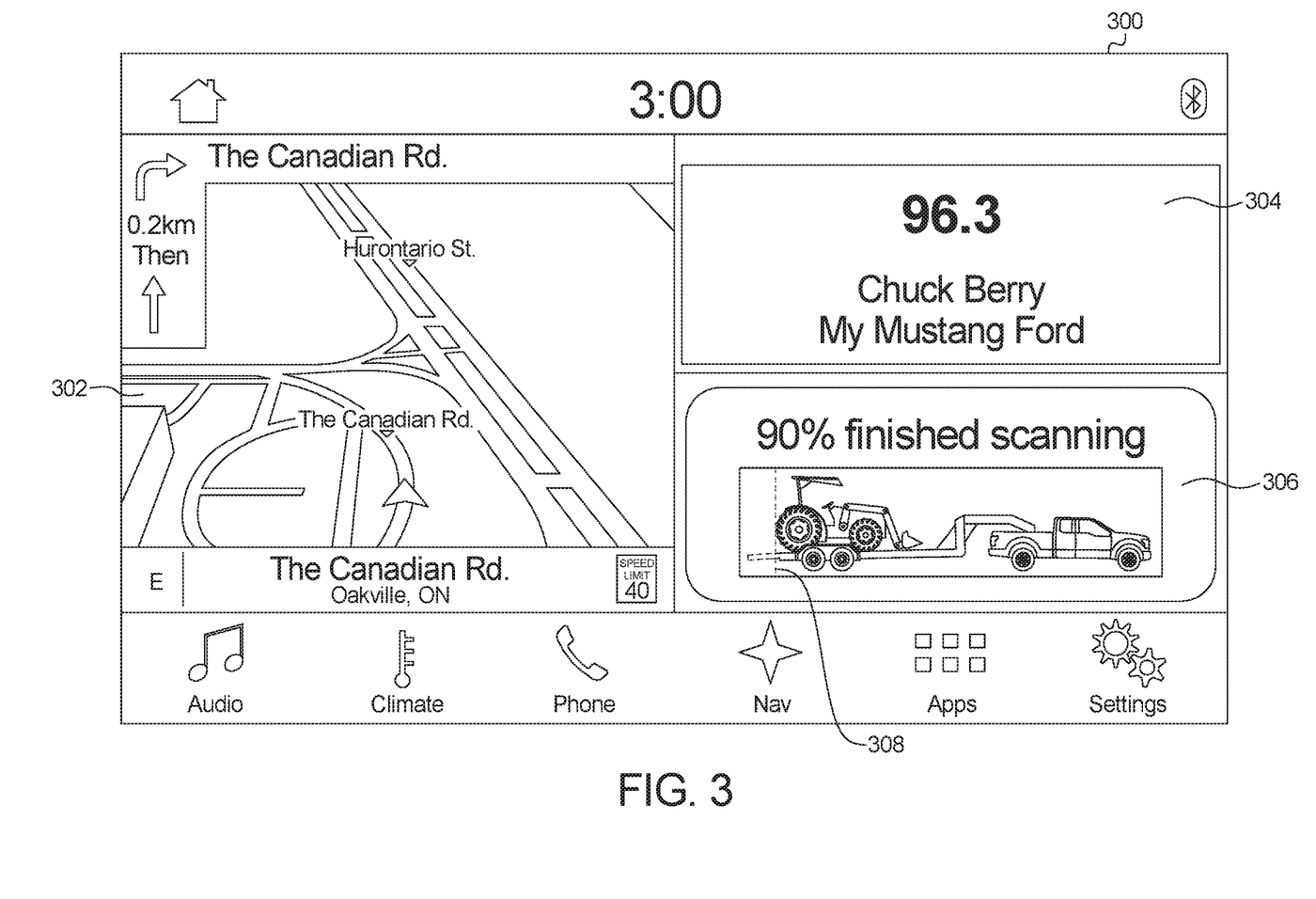
FIG. 3 illustrates an example human machine interface to display a status update of the automated detection of trailer properties.

FIG. 3 illustrates an example human machine interface 300 to display a status update of the automated detection of trailer properties. In the illustrated example of FIG. 3, the HMI 300 includes different sections associated with different operations. For example, the HMI 300 includes a navigation section 302, a media section 304, and a progress section 306.

The navigation section 302 of FIG. 3 facilitates navigation using turn-by-turn directions. The media section 304 displays what media is currently playing in the vehicle 100. The progress section 306 provides the user a status update of the automated detection of trailer properties process. In the illustrated example of FIG. 3, the progress section 306 indicates that the automated detection of trailer properties is 90 percent complete. The example progress section 306 includes a dashed line 308 to indicate how much of the trailer 116 has been scanned.

While the example HMI 300 of FIG. 3 includes three example sections, it should be appreciated that any quantity of sections may be included in the HMI. Furthermore, it should be appreciated that the included sections of the HMI may be arranged in any suitable manner. For example, the HMI may include the progress section in a main portion of the interface.

Figure 4:
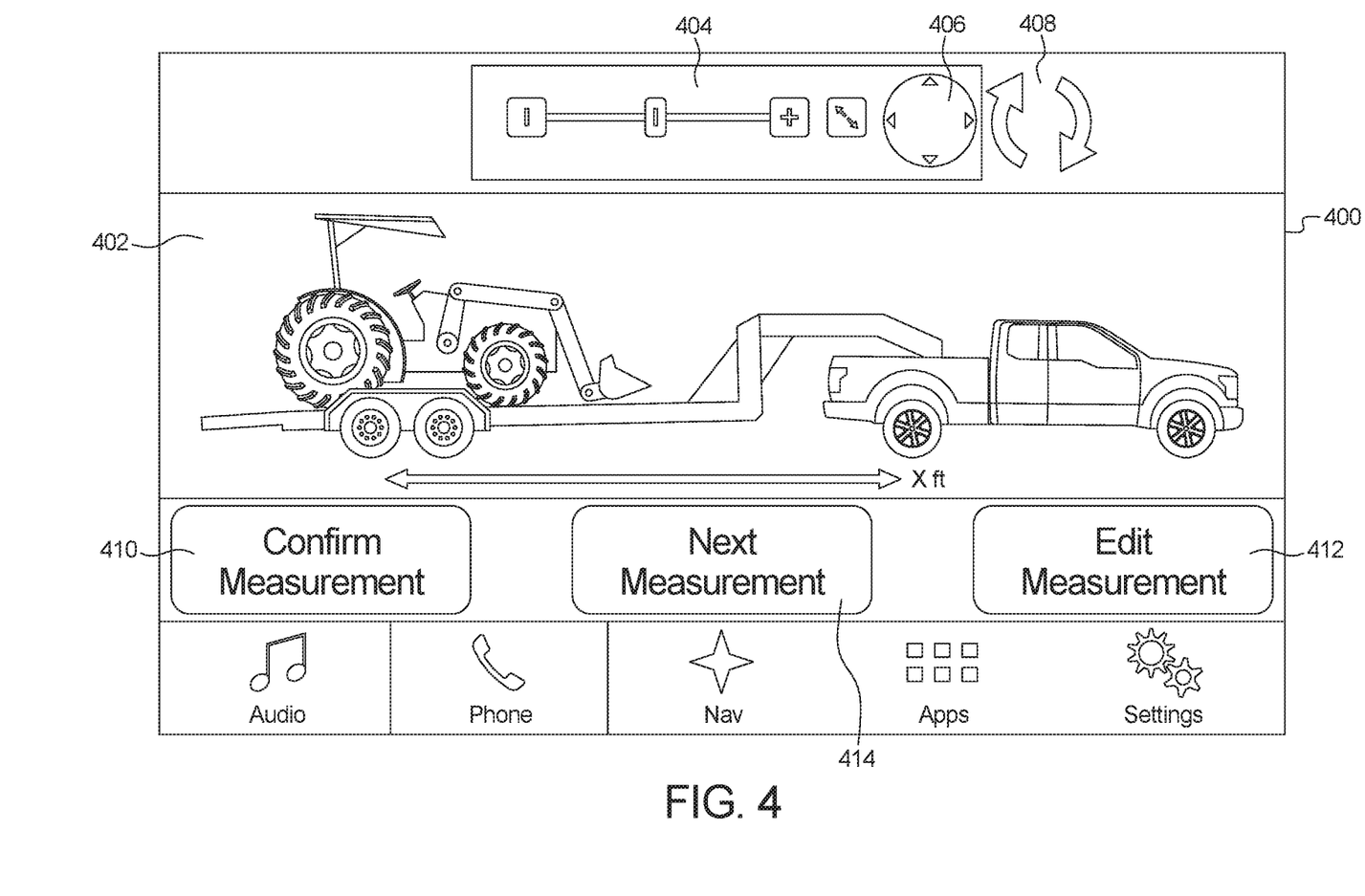
FIG. 4 illustrates an example human machine interface to display and manipulate a composite image.

FIG. 4 illustrates an example human machine interface 400 to display and manipulate a composite image 402. The HMI 400 facilitates the user reviewing and changing any measured properties of the trailer. In the illustrated example of FIG. 4, the HMI 400 includes a zoom tool 404, a pan tool 406, a rotate tool 408, a confirm measurement tool 410, an edit measurement tool 412, and a next measurement tool 414.

The zoom tool 404 facilitates a user changing a draw distance by changing the angle of view. The pan tool 406 facilitates a user changing an orientation of a viewpoint to change the portion of the scene that is rendered in the composite image 402. The rotate tool 408 facilitates a user changing an angle of view of the scene that is rendered in the composite image 402. The confirm measurement tool 410 facilitates a user accepting a displayed property of the trailer. In the illustrated example, the user may accept that the distance from the rear axle of the vehicle 100 to the rear axle of the trailer 116 is "X ft." The edit measurement tool 412 facilitates a user manipulating the value of the displayed property. For example, the user may increase or decrease the distance from the rear axle of the vehicle 100 to the center of gravity of the trailer 116. The next measurement tool 414 facilitates a user being displayed another property of the trailer.

Figure 5:
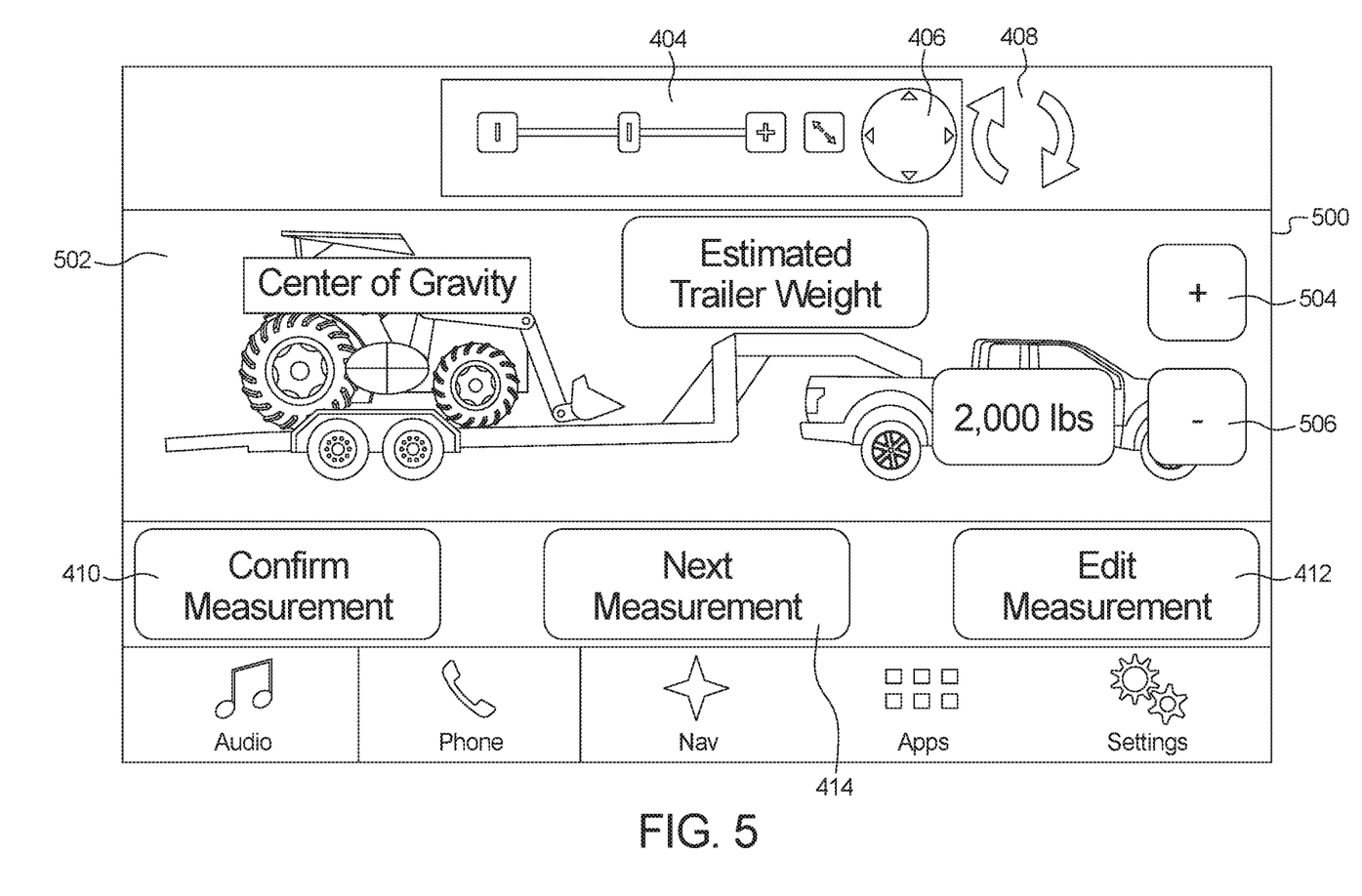
FIG. 5 illustrates another example human machine interface to display and manipulate the composite image.

FIG. 5 illustrates another example human machine interface 500 to display and manipulate a composite image 502. The HMI 500 facilitates the user reviewing and changing any measured properties of the trailer. In the illustrated example of FIG. 5, the HMI 500 facilitates the user changing the estimated weight of the trailer. The example HMI 500 includes the zoom tool 404, the pan tool 406, the rotate tool 408, the confirm measurement tool 410, the edit measurement tool 412, and the next measurement tool 414 of FIG. 4. The example HMI 500 of FIG. 5 also includes an increase measurement tool 504 to increase the value of the measured property (e.g., the estimated weight of the trailer) and a decrease measurement tool 506 to decrease the value of the measured property.

Figure 6:
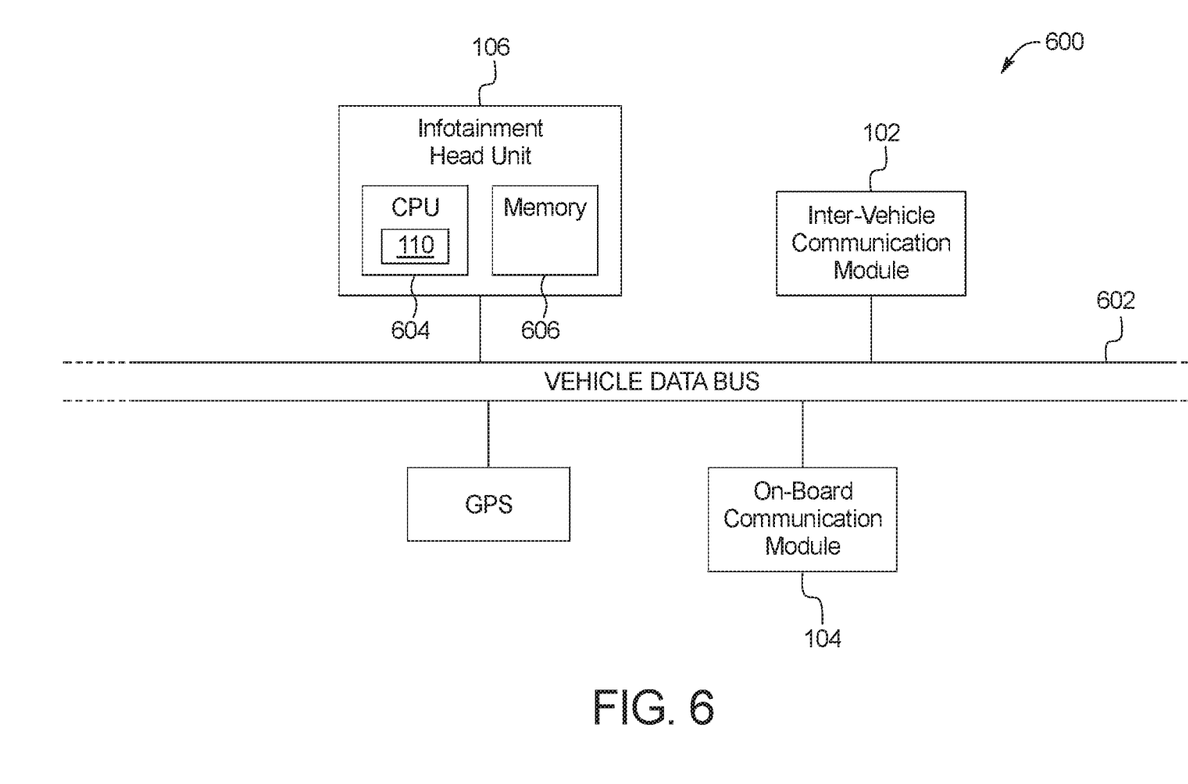
FIG. 6 is a block diagram of electronic components of the vehicle of FIG. 1.

FIG. 6 is a block diagram of electronic components 600 of the vehicle 100 of FIG. 1. In the illustrated example, the electronic components 600 include the inter-vehicle communication module 102, the on-board communications module 104, the infotainment head unit 106, and a vehicle data bus 602.

In the illustrated example, the infotainment head unit 106 includes a processor or controller 604 and memory 606. In the illustrated example, the infotainment head unit 106 is structured to include the properties estimator 110. Alternatively, in some examples, the properties estimator 110 may be incorporated into another electronic control unit (ECU) with its own processor and memory (such as on-board computing platforms, an ADAS module, etc.).

The processor or controller 604 may be any suitable processing device or set of processing devices such as, but not limited: a microprocessor, a microcontroller-based platform, a suitable integrated circuit, one or more field programmable gate arrays (FPGAs), and/or one or more application-specific integrated circuits (ASICs).

The memory 606 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 606 includes multiple kinds of memory, particularly volatile memory and non-volatile memory.

The memory 606 is computer readable media on which one or more sets of instructions, such as software for operating the methods of the present disclosure, can be embedded. The instructions may embody one or more of the methods or logic as described herein. For example, the instructions may reside completely, or at least partially, within any one or more of the memory 606, the computer readable medium, and/or within the processor 604 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. Further, the terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 602 communicatively couples the inter-vehicle communication module 102, the on-board communications module 104, and the infotainment head unit 106. In some examples, the vehicle data bus 602 includes one or more data buses. The vehicle data bus 602 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
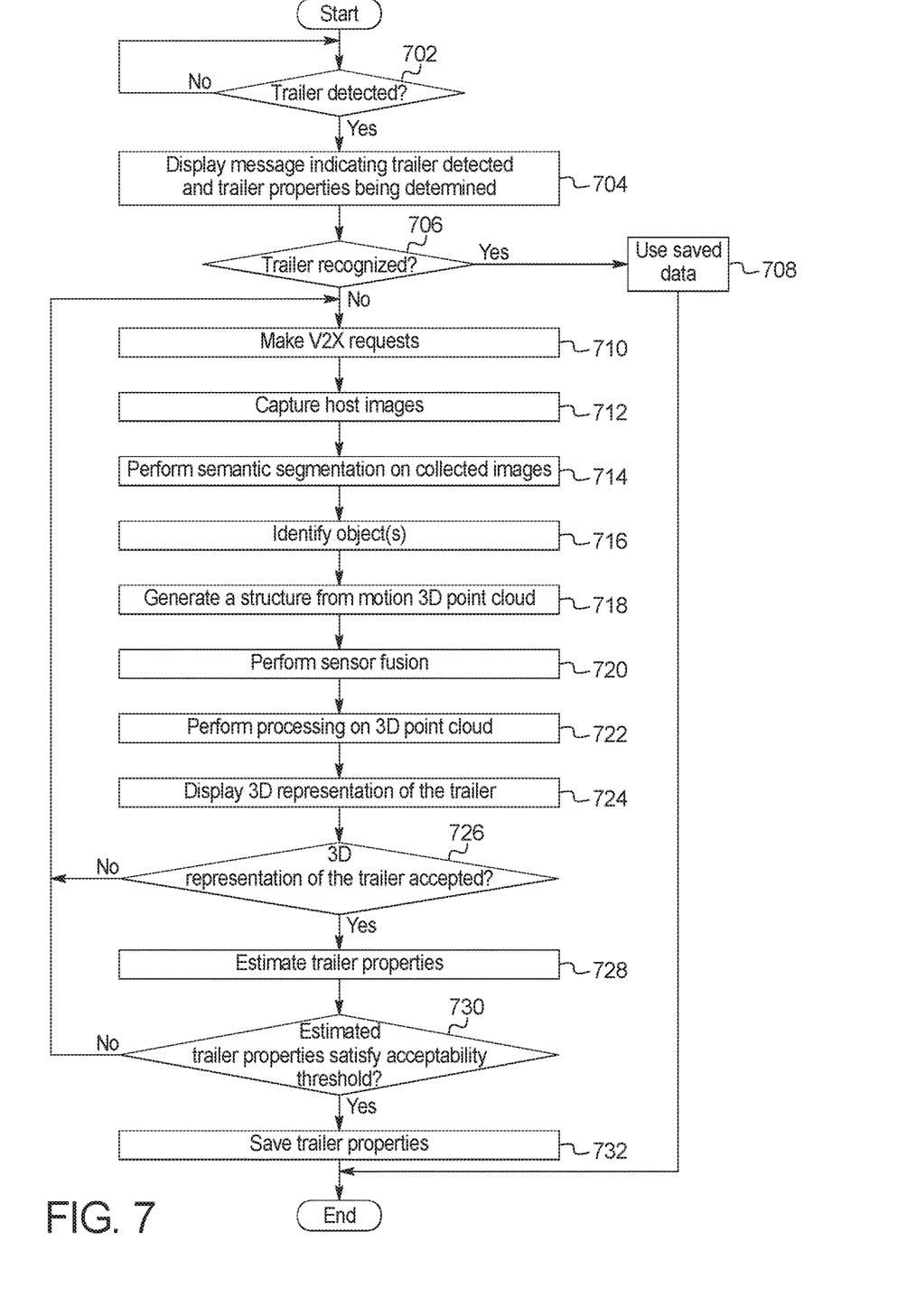
FIG. 7 is a flowchart of a method to automatically detect properties of a trailer using images received via inter-vehicle communication, which may be implemented by the electronic components of FIG. 6.

FIG. 7 is a flowchart of a method 700 to automatically detect properties of a trailer using images received via inter-vehicle communication, which may be implemented by the electronic components 600 of FIG. 6. Initially, at block 702, the properties estimator 110 waits until a trailer is detected (e.g., attached to the vehicle 100). When the properties estimator 110 detects the trailer, the properties estimator 110 displays a message to the user via the infotainment system indicating that a trailer was detected and that trailer properties are being determined. At block 706, the properties estimator 110 determines whether the trailer is recognized (e.g., whether properties of the trailer are stored, for example, in memory of the vehicle 100). If, at block 706, the properties estimator 110 determines that the trailer is recognized (e.g., that trailer properties are stored in memory of the vehicle 100), then, at block 708, the properties estimator 110 retrieves the stored properties (e.g., from the memory of the vehicle 100) and uses the retrieved properties. In some examples, the properties estimator 110 may display the retrieved properties to the user to facilitate the user reviewing and/or manipulating one or more of the trailer properties. The example method 700 of FIG. 7 then ends.

If, at bock 706, the properties estimator 110 determines that the attached trailer is not recognized, then, at block 710, the properties estimator 110 broadcasts a message via inter-vehicle communication to the target vehicles 108 and/or the roadside units 109 requesting images. For example, the properties estimator 110 may select the target vehicles 108 and/or the roadside units 109 based on proximity to the host vehicle 100, whether the target vehicles 108 and/or the roadside units 109 are able to visualize the host vehicle 100 (e.g., have line-of-sight with the host vehicle 100, etc.), etc. In some examples, At block 712, the properties estimator 110 causes the vehicle 100 to capture images of the vehicle 100 and the attached trailer. For example, the properties estimator 110 may cause the rear-view camera of the vehicle 100 to capture images of the trailer. At block 714, the properties estimator 110 performs semantic segmentation on the images from the target vehicles 108, the roadside units 109 and/or the images captured by the vehicle 100. At block 716, the properties estimator 110 identifies object(s) included in the captured images. For example, as the properties estimator 110 receives images, the properties estimator 110 identifies the trailer 116 and associated objects (e.g., wheels, ball hitch, trailer lights, etc.) within the images.

At block 718, the properties estimator 110 generates a three dimensional point cloud of the trailer 116 using structure from motion techniques. At block 720, the properties estimator 110 performs sensor fusion. For example, the properties estimator 110 may merge (e.g., iteratively merge) data captured via other sensors (e.g., LiDAR, etc.) to the three dimensional point cloud. At block 722, the properties estimator 110 performs processing on the three dimensional point cloud. For example, the properties estimator 110 may perform averaging, filtering, and scaling to the three dimensional point cloud based on known geometries of trailers.

At block 724, the properties estimator 110 cause the infotainment unit to display a three dimensional representation of the trailer (e.g., a composite image). At block 726, the properties estimator 110 determines whether the displayed three dimensional representation of the trailer is accepted. For example, the user may indicate, via an HMI, that the displayed three dimensional representation of the trailer is accepted or not accepted. In some examples, the properties estimator 110 may apply statistical techniques to estimate an error of the three dimensional representation of the trailer and determine whether the displayed representation is acceptable. For example, the properties estimator 110 may determine whether positional accuracy of the trailer wheel position satisfies an error threshold to determine whether the three dimensional representation of the trailer is acceptable. If, at block 726, the properties estimator 110 determines that the displayed representation is not acceptable, control returns to block 710.

If, at block 726, the properties estimator 110 determines that the displayed representation is acceptable (e.g., the user indicates via a tool of the HMI that the displayed representation is acceptable, the properties estimator 110 determines the three dimensional representation is within a statistically significant level of confidence, etc.), then, at block 728, the properties estimator 110 uses the three dimensional representation to estimate (or measure) properties of the attached trailer 116. For example, the properties estimator 110 may estimate properties of the trailer such as: (a) a horizontal distance from the license plate to the center of the ball hitch on the trailer, (b) a horizontal distance from the center of the ball hitch to the center of a sticker/optical pattern/feature point, (c) a distance from the rear-view camera to the center of the sticker/optical pattern/feature point, (d) a distance from the tailgate to the center of the trailer axle (single axle) or the center of the trailer axis (two or more axis), (e) weight of the trailer, (0 center of mass of the trailer, (g) center of the mass of the vehicle and the attached trailer, etc.

At block 730, the properties estimator 110 determines whether the estimated trailer properties satisfy an acceptability threshold. For example, the properties estimator 110 may wait for user input indicating that the estimated properties are acceptable. In some examples, the properties estimator 110 may compare the estimated properties to a statistically significant level of confidence to determine whether the estimated trailer properties satisfy the acceptability threshold. If, at block 730, the properties estimator 110 determines that the estimated trailer properties fail to satisfy the acceptability threshold, control returns to block 710.

If, at block 730, the properties estimator 110 determines that the estimated trailer properties satisfy the acceptability threshold, then, at block 732, the properties estimator 110 saves the estimated trailer properties. For example, the properties estimator 110 may record the estimated trailer properties and characteristics associated with the attached trailer 116 in a memory (e.g., the memory 606) of the vehicle 100. The example method 700 of FIG. 7 then ends.

The flowchart of FIG. 7 is representative of machine-readable instructions stored in memory (such as the memory 606 of FIG. 6) that comprise one or more programs that, when executed by a processor (such as the processor 604 of FIG. 6), cause the vehicle 100 to implement the example properties estimator 110 of FIGS. 1 and/or 6. Further, although the example program(s) is/are described with reference to the flowchart illustrated in FIG. 7, many other methods of implementing the example properties estimator 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." As used herein, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an inter-vehicle communication module;
a computer processor operable to execute a set of computer-readable instructions; and
a memory operable to store the set of computer-readable instructions operable to:
detect a presence of an attached trailer;
determine that the attached trailer is an unrecognized trailer;
broadcast, to a second vehicle and based on the determination that the attached trailer is an unrecognized trailer, a request for images of the attached trailer via the inter-vehicle communication module;
receive the images of the attached trailer from the second vehicle;
perform semantic segmentation on the images;
generate a three dimensional point cloud using the segmented images; and
determine a property of the attached trailer based on the three dimensional point cloud.

2. The vehicle of claim 1, wherein the request for the images includes geo-spatial information regarding the vehicle to facilitate recipients of the request for images to locate the vehicle.

3. The vehicle of claim 1, wherein generate the three dimensional point cloud further comprises stitch the images together using a structure from motion technique.

4. The vehicle of claim 1, generate the three dimensional point cloud further comprises perform sensor fusion with the three dimensional point cloud by iteratively merging sensor data with the three dimensional point cloud.

5. The vehicle of claim 1, wherein the three dimensional representation of the attached trailer is based on the three dimensional point cloud and additional processing performed on the three dimensional point cloud.

6. The vehicle of claim 5, wherein perform the additional processing on the three dimensional point cloud further comprises average, filter and scale the three dimensional point cloud.

7. The vehicle of claim 5, wherein the computer-readable instructions are further operable to display the three dimensional representation when the three dimensional representation is partially completed as the images are received over time.

8. The vehicle of claim 1, wherein the computer-readable instructions are further operable to record (1) the determined properties and (2) characteristics associated with the attached trailer to facilitate subsequent recognition of the attached trailer.

9. The vehicle of claim 1, wherein the computer-readable instructions are further operable to detect the presence of the attached trailer based on a rear-view camera, a detected change in driving dynamics associated with the vehicle, or a connection of trailer break lights.

10. The vehicle of claim 1, wherein the computer-readable instructions are further operable to estimate at least one of: (a) a horizontal distance from a license plate to a center of a ball hitch on the attached trailer, (b) a horizontal distance from the center of the ball hitch to a center of a feature point, (c) a distance from a rear-view camera to the center of the feature point, (d) a distance from a tailgate to a center of a trailer axle, (e) a weight of the attached trailer, (f) a center of mass of the attached trailer, or (g) a center of the mass of the vehicle and the attached trailer.

11. A method comprising:
detecting, via a processor of a vehicle, a presence of an attached trailer;
determining that the attached trailer is an unrecognized trailer;
broadcasting, via an inter-vehicle communication module, to a second vehicle, and based on the determination that the attached trailer is an unrecognized trailer, a request for images of the attached trailer;

receiving the images of the attached trailer from the second vehicle;

performing, via the processor, semantic segmentation on the images;

generating, via the processor, a three dimensional point cloud using the segmented images; and determining, via the processor, a property of the attached trailer based on the three dimensional point cloud.

12. The method of claim 11, wherein the request for the images includes geo-spatial information regarding the vehicle to facilitate recipients of the request for images to locate the vehicle.

13. The method of claim 11, wherein the generating of the three dimensional point cloud includes stitching the images together using a structure from motion technique.

14. The method of claim 11, wherein the generating of the three dimensional point cloud includes performing sensor fusion with the three dimensional point cloud by iteratively merging sensor data with the three dimensional point cloud.

15. The method of claim 11, further including generating a three dimensional representation of the attached trailer based on the three dimensional point cloud and additional processing performed on the three dimensional point cloud.

16. The method of claim 15, wherein the performing of the additional processing on the three dimensional point cloud includes averaging, filtering and scaling of the three dimensional point cloud.

17. The method of claim 15, further including displaying, via a display device associated with the vehicle, the three dimensional representation when the three dimensional representation is partially completed as the images are received over time.

18. The method of claim 11, further including recording (1) the determined properties and (2) characteristics associated with the attached trailer to facilitate subsequent recognition of the attached trailer.

19. The method of claim 11, wherein the detecting of the presence of the attached trailer is based on a rear-view camera, a detected change in driving dynamics associated with the vehicle, or a connection of trailer break lights.

20. The method of claim 11, wherein the determined property is at least one of: (a) a horizontal distance from a license plate to a center of a ball hitch on the attached trailer, (b) a horizontal distance from the center of the ball hitch to a center of a feature point, (c) a distance from a rear-view camera to the center of the feature point, (d) a distance from a tailgate to a center of a trailer axle, (e) a weight of the attached trailer, (f) a center of mass of the attached trailer, or (g) a center of the mass of the vehicle and the attached trailer.

* * * * *